US 6,709,053 B1

(12) United States Patent
Humer et al.

(10) Patent No.: US 6,709,053 B1
(45) Date of Patent: Mar. 23, 2004

(54) VEHICLE SEAT ASSEMBLY WITH ENERGY MANAGING MEMBER

(75) Inventors: Mladen Humer, Eastpointe, MI (US); Stephen G. Lambrecht, New Hudson, MI (US)

(73) Assignee: Lear Corporation, Southfield, MI (US)

( * ) Notice: Subject to any disclaimer, the term of this patent is extended or adjusted under 35 U.S.C. 154(b) by 9 days.

(21) Appl. No.: 10/260,848

(22) Filed: Sep. 30, 2002

(51) Int. Cl.$^7$ ................................................ B60N 2/42
(52) U.S. Cl. .................. 297/216.1; 297/216.14
(58) Field of Search ....................... 297/216.13, 216.14, 297/216.1; 296/68.1

(56) References Cited

U.S. PATENT DOCUMENTS

| | | |
|---|---|---|
| 3,531,154 A | 9/1970 | Fleche |
| 3,578,376 A * | 5/1971 | Hasegawa et al. ......... 269/68.1 |
| 3,582,133 A | 6/1971 | DeLavenne |
| 3,802,737 A | 4/1974 | Mertens |
| 4,145,081 A | 3/1979 | Withers |
| 4,938,527 A | 7/1990 | Schmale et al. |
| 5,219,202 A | 6/1993 | Rink et al. |
| 5,310,030 A | 5/1994 | Kawakita et al. |
| 5,318,341 A | 6/1994 | Griswold et al. |
| 5,468,044 A | 11/1995 | Coman |
| 5,597,205 A | 1/1997 | Glance et al. |
| 5,676,421 A | 10/1997 | Brodsky |
| 5,938,265 A | 8/1999 | Oyabu et al. |
| 5,967,604 A | 10/1999 | Yoshida et al. |
| 6,022,074 A | 2/2000 | Swedenklef |
| 6,024,406 A * | 2/2000 | Charras et al. ......... 297/216.14 |
| 6,164,720 A * | 12/2000 | Haglund ................. 297/216.1 |
| 6,244,656 B1 * | 6/2001 | Mueller ................. 297/216.13 |
| 6,296,306 B1 * | 10/2001 | Specht et al. .......... 297/216.14 |
| 6,325,457 B1 * | 12/2001 | Matsumoto et al. ........ 297/366 |
| 6,340,206 B1 * | 1/2002 | Andersson et al. .... 297/216.14 |
| 6,354,659 B1 * | 3/2002 | Andersson et al. .... 297/216.14 |
| 6,416,126 B1 * | 7/2002 | Håland et al. ......... 297/216.13 |
| 6,416,127 B1 * | 7/2002 | Galbreath et al. ..... 297/216.13 |
| 2003/0001415 A1 * | 1/2003 | Haland et al. ......... 297/216.14 |

* cited by examiner

Primary Examiner—Peter M. Cuomo
Assistant Examiner—Stephen D'Adamo

(57) ABSTRACT

A vehicle seat assembly for use with a vehicle includes a seat cushion frame adapted to be installed in the vehicle. An energy managing support bracket is attached to the seat cushion frame, and a recliner mechanism is attached to the support bracket. The assembly also includes a seat back frame connected to the recliner mechanism such that the seat back frame is pivotable with respect to the seat cushion frame. Furthermore, the support bracket is configured to attenuate energy associated with a rear impact to the vehicle when the assembly is installed in the vehicle, so as to inhibit rebound of the seat back frame.

31 Claims, 4 Drawing Sheets

VEHICLE SEAT ASSEMBLY WITH ENERGY MANAGING MEMBER

BACKGROUND OF THE INVENTION

1. Field of the Invention

The invention relates to vehicle seat assemblies for use with motor vehicles.

2. Background Art

A vehicle seat assembly for use with a motor vehicle may include a seat cushion frame connected to a seat back frame by a pair of pivotable joints. The pivotable joints allow the seat back frame to pivot with respect to the seat cushion frame. Examples of vehicle seat assemblies are disclosed in U.S. Pat. Nos. 5,219,202 and 6,022,074.

SUMMARY OF THE INVENTION

Under the invention, a vehicle seat assembly for use with a vehicle includes a seat cushion frame adapted to be installed in the vehicle. An energy managing support bracket is attached to the seat cushion frame, and a recliner mechanism is attached to the support bracket. The assembly also includes a seat back frame connected to the recliner mechanism such that the seat back frame is pivotable with respect to the seat cushion frame. Furthermore, the support bracket is configured to attenuate energy associated with a rear impact to the vehicle when the assembly is installed in the vehicle, so as to inhibit rebound of the seat back frame.

DETAILED DESCRIPTION OF THE PREFERRED EMBODIMENTS

Figure 1:
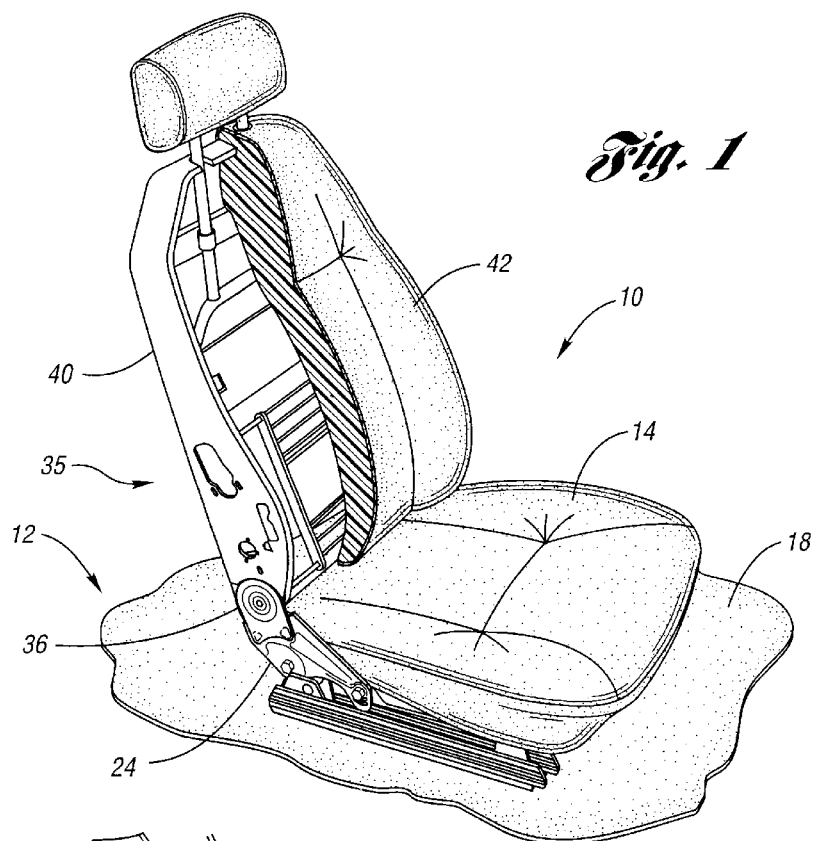
FIG. 1 is a perspective view of a vehicle seat assembly according to the invention mounted to a floor of a motor vehicle, with a portion of a seat back cushion broken away to show interior components of the assembly.
Figure 2:
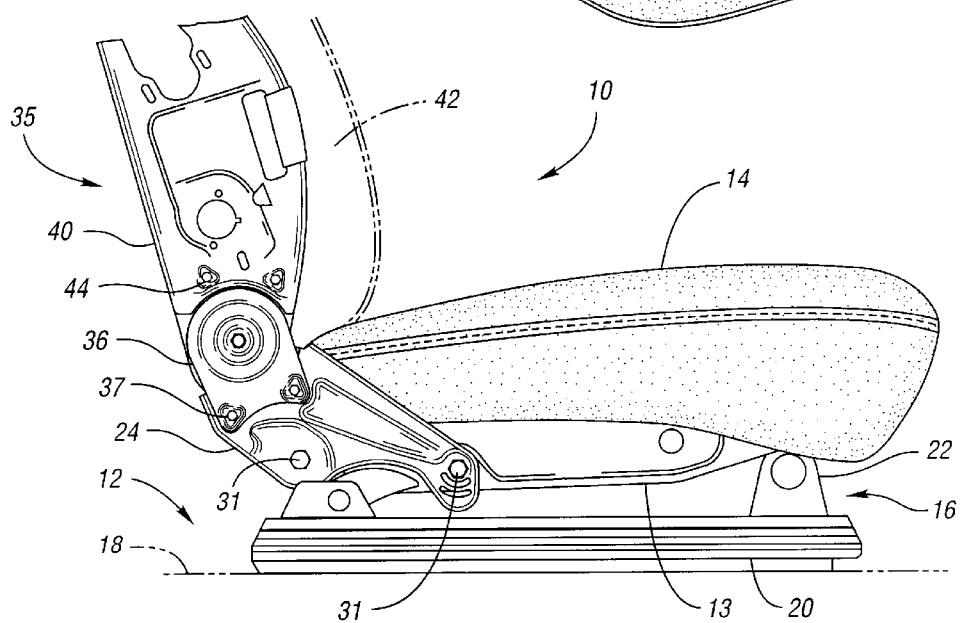
FIG. 2 is a side view of the assembly showing an energy managing support bracket connected between a seat cushion frame and a seat back frame.
Figure 3:
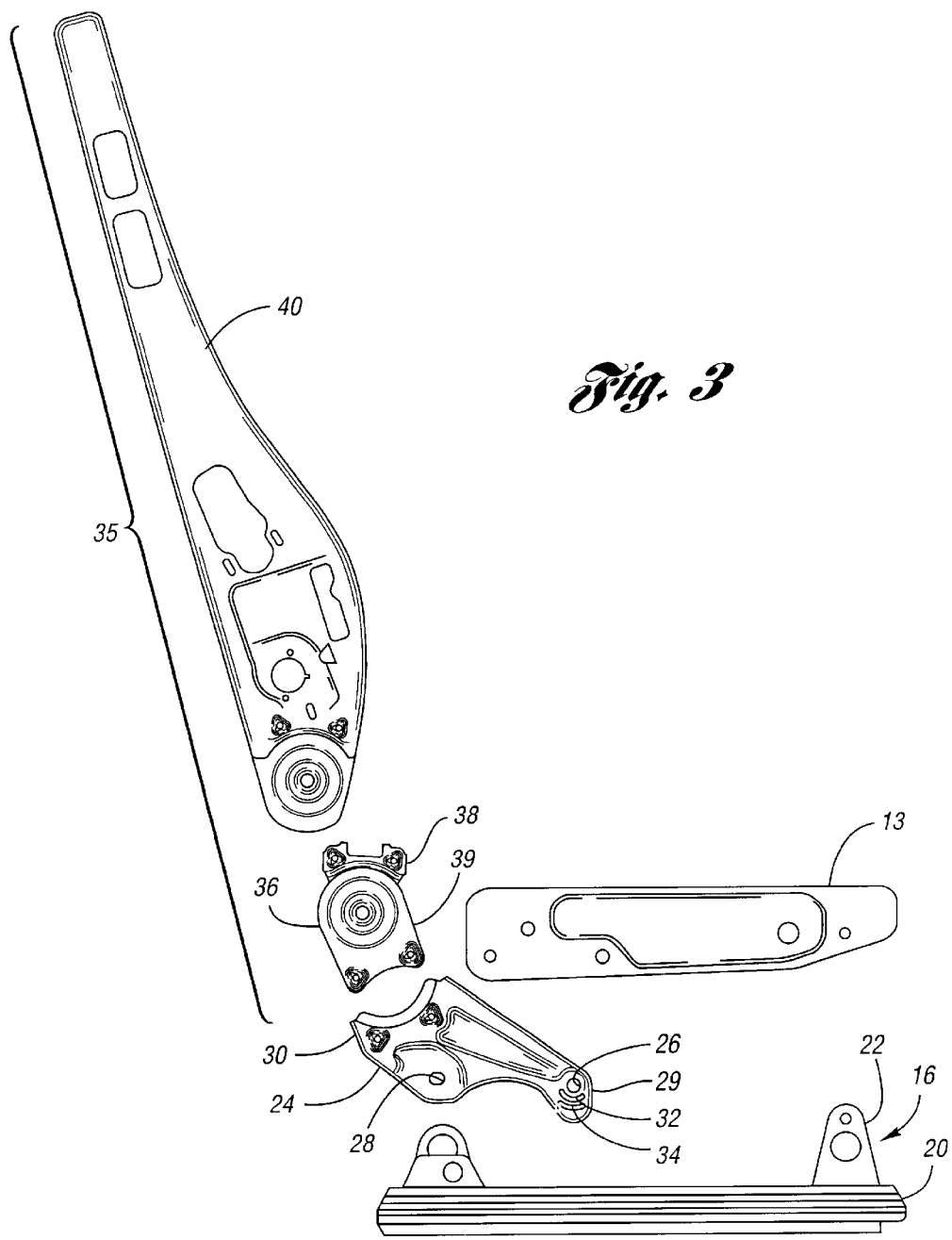
FIG. 3 is an exploded side view of the assembly.

FIGS. 1–3 show a vehicle seat assembly 10 according to the invention for use with a motor vehicle 12. The seat assembly 10 includes a lower seat cushion frame 13 that supports a lower seat cushion 14, and is adapted to be installed in the vehicle 12. In the embodiment shown in FIGS. 1–3, for example, the seat cushion frame 13 is attached to a seat adjustment mechanism 16, which is attached to floor 18 of the vehicle 12. The seat adjustment mechanism 16 may include a fore-aft adjuster 20 for adjusting the seat cushion frame 13 forwardly and rearwardly with respect to the vehicle 12. Alternatively or supplementally, the seat adjustment mechanism 16 may include a height adjuster 22 for adjusting the height of the seat cushion frame 13. As yet another alternative, the seat assembly 10 may be provided without a seat adjustment mechanism, and the seat cushion frame 13 may be attached to the floor 18, or otherwise installed in the vehicle 12, in any suitable manner.

The seat assembly 10 also includes a pair of sacrificial, energy managing support brackets 24 attached to opposite sides of the seat cushion frame 13 in any suitable manner (only right side support bracket 24 is shown in FIGS. 1–3). For example, each support bracket 24 may be provided with first and second attachment locations, such as front and rear attachment locations 26 and 28, respectively, that are attached to the seat cushion frame 13. In the embodiment shown in FIGS. 1–3, the front attachment location 26 is disposed proximate front end 29 of the support bracket 24, and rear attachment location 28 is disposed proximate rear end 30 of the support bracket 24. Each of the attachment locations 26 and 28 may also include a hole, and the seat assembly 10 may further includes fastening members 31 that extend through the holes so as to attach each support bracket 24 to the seat cushion frame 13. Furthermore, in the embodiment shown in FIGS. 1–3, the support brackets 24 are not attached to the seat adjustment mechanism 16.

Each support bracket 24 is also configured to absorb or otherwise attenuate rear impact energy, as explained below in greater detail. More specifically, each support bracket 24 may be provided with one or more energy attenuating features. In the embodiment shown in FIGS. 1–3, for example, each support bracket 24 includes first and second apertures 32 and 34, respectively, disposed generally beneath, or otherwise proximate to, the front attachment location 26. These apertures 32 and 34 create weak points in the support brackets 24 that will plastically deform when subjected to sufficient loading. While each aperture 32 and 34 may have any suitable configuration, such as a rectangular slot or a circular opening, each aperture 32 and 34 shown in FIGS. 1–3 is an arcuate slot. Alternatively, each support bracket 24 may be provided with one or more apertures that are configured to attenuate energy associated with a rear impact. Furthermore, such apertures may be disposed proximate the front attachment location 26, proximate the rear attachment location 28, and/or elsewhere within each support bracket 24.

As another example, in lieu of or in addition to one or more apertures, such as the apertures 32 and 34, each support bracket 24 may be formed with a reduced thickness proximate the front attachment location 26, as compared with other portions of the support bracket 24. For instance, each support bracket 24 may have a thickness in the range of 1–2 millimeters (mm) generally beneath the front attachment location 26, and a thickness in the range of 3–5 mm for the remainder of the support bracket 24. Such a configuration provides a weak point proximate the first attachment location 26 that will plastically deform when subjected to sufficient loading. Alternatively or supplementally, each support bracket 24 may be formed with a reduced thickness proximate the rear attachment location 28, as compared with other portions of the support bracket 24.

While the support brackets 24 may comprise any suitable deformable material, in one embodiment of the invention, each support bracket 24 comprises metal. For example, each support bracket 24 may comprise stamped steel, aluminum and/or titanium. As another example, each support bracket 24 may comprise cast aluminum or magnesium.

Returning to FIGS. 1–3, the seat assembly 10 also includes a seat back frame subassembly 35 attached to and fully supported by the support brackets 24. The seat back frame subassembly 35 includes a pair of pivot or recliner mechanisms 36, and each recliner mechanism 36 is attached to a respective support bracket 24 (only right side recliner mechanism 36 is shown in FIGS. 1–3). While the recliner mechanisms 36 may be attached to the support brackets 24 in any suitable manner, in the embodiment shown in FIGS. 1–3, each recliner mechanism 36 is attached to a respective support bracket 24 with removable fasteners 37, such as bolts. Each recliner mechanism 36 includes first and second portions 38 and 39, respectively, and each first portion 38 is pivotable with respect to a respective second portion 39.

The seat back frame subassembly 35 also includes a seat back frame 40 that supports a seat back cushion 42. The seat back frame 40 is connected to the recliner mechanisms 36 such that the seat back frame 40 is pivotable with respect to the seat cushion frame 13. In the embodiment shown in FIGS. 1–3, the seat back frame 40 is attached to the recliner mechanisms 36 with removable fasteners 44, such as bolts. Alternatively, the seat back frame 40 may be attached to the recliner mechanisms 36 in any suitable manner, such as by welding the recliner mechanisms 36 to the seat back frame 40.

Figure 4:
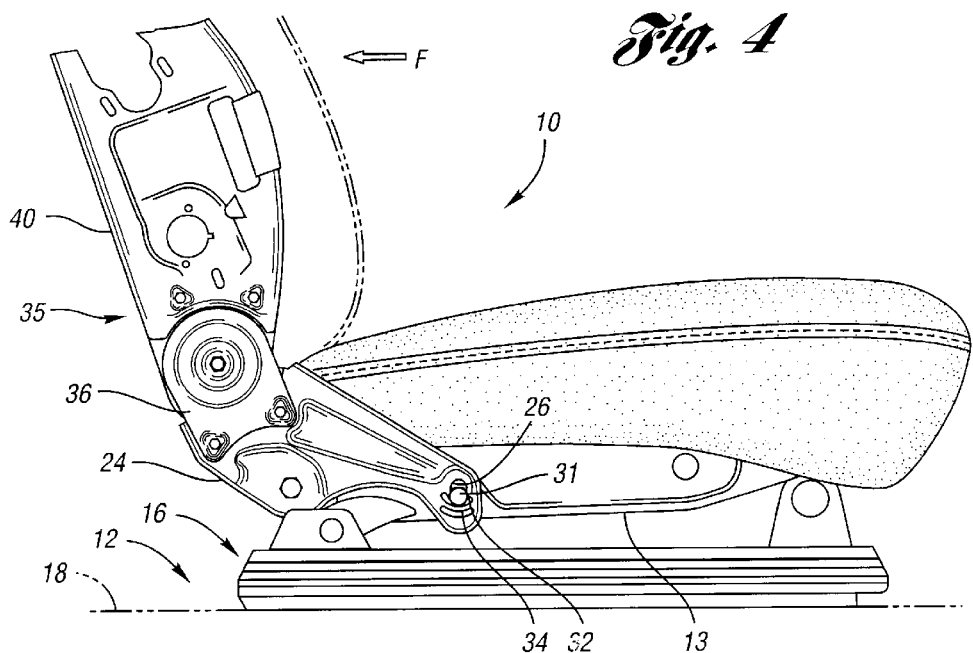
FIG. 4 is a side view of the assembly showing the support bracket plastically deformed as a result of a rear impact to the vehicle.

Advantageously, as mentioned above, the support brackets 24 are configured to attenuate rear impact energy. For example, referring to FIG. 4, when the vehicle 12 is subjected to a sufficient rear impact, such that an occupant (not shown) of seat assembly 10 applies a sufficient rearward force F to the seat back frame 40, the support brackets 24 will plastically deform so as to reduce or otherwise inhibit rebound of the seat back frame 40. Rebound refers to the tendency of the seat back frame 40 to spring forward after the rearward force F diminishes. As shown in FIG. 4, plastic deformation may occur proximate the apertures 32 and 34. Depending on the severity of the rear impact, each support bracket 24 may deform in such a manner that each fastening member 31, extending through a respective front attachment location 26, may extend into one or both of the apertures 32 and 34 of the support bracket. Alternatively or additionally, each support bracket 24 may plastically deform proximate weak points created by reduced material thicknesses.

Preferably, each support bracket 24 includes a stop feature for inhibiting plastic deformation of the support bracket 24 beyond a maximum amount, to thereby inhibit the seat back frame 40 from pivoting rearwardly beyond a desired maximum point during an impact event. For example, the portion of the support bracket 24 disposed beneath the apertures 32 and 34 may function as such a stop feature.

If one or both support brackets 24 experiences significant deformation, the support brackets 24 may be removed from the seat assembly 10 by removing the fasteners 31 and 37. New support brackets 24 may then be connected between the seat cushion frame 13 and the recliner mechanisms 36. With such a configuration, depending on the severity of the rear impact, the other components of the seat assembly 10 may be able to be reused. Thus, the support brackets 24 function as sacrificial, energy absorbing members that reduce or eliminate structural damage to the other components of the seat assembly 10, such as the seat cushion frame 13, recliner mechanisms 36 and/or seat back frame 40.

Figure 5:
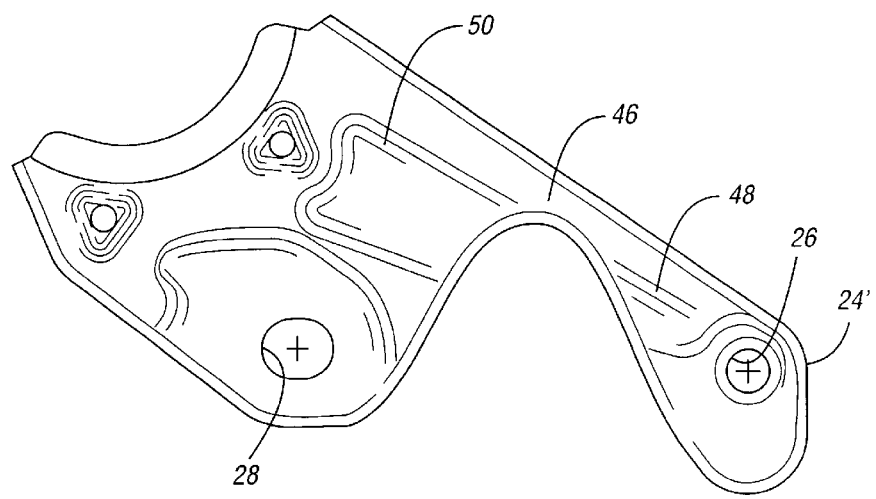
FIG. 5 is a side view of a second embodiment of the support bracket according to the invention.

FIG. 5 shows a second embodiment 24' of the support bracket (right side support bracket 24' is shown in FIG. 5), which includes a shape that provides an energy attenuating feature. More specifically, the support bracket 24' includes a tapered section 46 disposed between first and second wider sections 48 and 50, respectively, and the tapered section 46 provides a weak point that plastically deforms when subjected to sufficient loading. When the tapered section 46 is subjected to sufficient bending loading as a result of a rear impact, for example, the tapered section 46 will elongate. Alternatively, the shape of the support bracket 24' may be designed to provide multiple weak points that plastically deform when subjected to sufficient loading.

Depending on the severity of the impact, the loading on the tapered section 46 may become mostly tensile loading after a certain amount of plastic deformation has occurred. Advantageously, the tapered section 46 may be configured to act as a stop feature when subjected to tensile loading to inhibit further deformation of the support bracket 24'.

Figure 6:
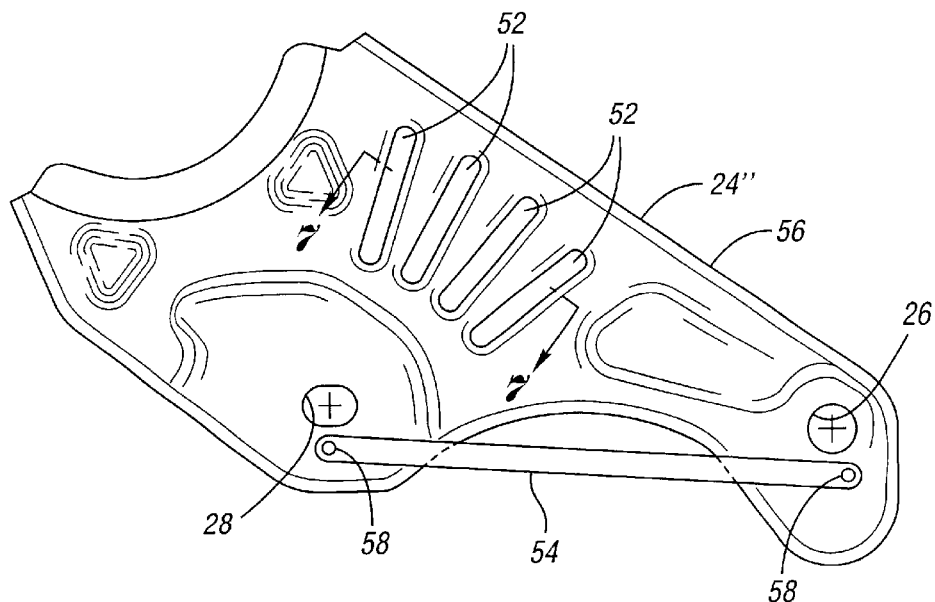
FIG. 6 is a side view of a third embodiment of the support bracket accord to the invention.
Figure 7:
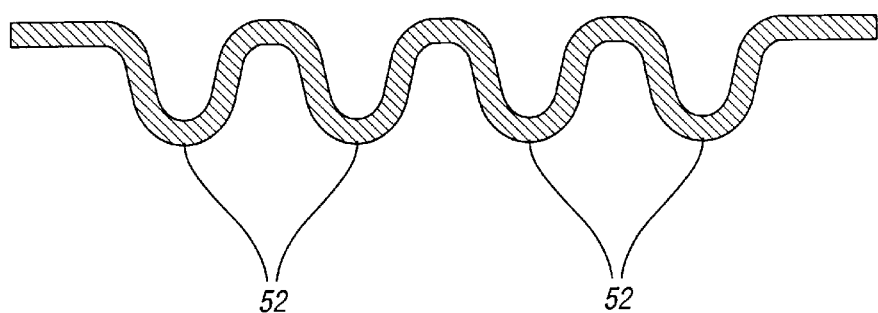
FIG. 7 is a fragmentary cross-sectional view of the support bracket of FIG. 6 taken along line 7—7 and viewed in the direction of the arrows.

FIGS. 6 and 7 show a third embodiment 24" of the support bracket (right side support bracket 24" is shown in FIG. 6), which includes multiple convolutions, such as folds 52, that function as energy attenuating features. Furthermore, each fold 52 may extend generally radially from rear attachment location 28. When the folds 52 are subjected to sufficient bending and/or tensile loading, one or more of the folds 52 will plastically deform. More specifically, one or more of the folds 52 will partially or completely flatten out or straighten when subjected to sufficient loading as a result of a rear impact. Advantageously, when a particular fold 52 sufficiently flattens out, the particular fold 52 will then act as a stop feature that inhibits further plastic deformation of the support bracket 24" at the particular fold 52.

Alternatively, the support bracket 24" may include one or more folds that each provide a weak point. Furthermore, such folds may be oriented generally transversely to the direction of tensile loading during a rear impact.

The support bracket 24" may also include a retaining member, such as an elongated retaining bar 54, that extends from a point proximate the front attachment location 26 to a point proximate the rear attachment location 28. The retaining bar 54, which may comprise any suitable material such as steel, helps to maintain proper spacing between the attachment locations 26 and 28 during and after an impact event. Furthermore, the retaining bar 54 may be attached to main body 56 of the support bracket 24" in any suitable manner. For example, the retaining bar 54 may be attached to main body 56 with mechanical fasteners 58, such as bolts or screws.

It should be noted that support brackets according to the invention may each be provided with one or more of the energy attenuating features described above in detail. For example, each support bracket of a seat assembly according to the invention may include one or more apertures, one or more reduced thickness portions, one or more tapered sections, and/or one or more convolutions.

Furthermore, support brackets according to the invention may be provided with or without a retaining member described above, for maintaining desired spacing between the attachment locations 26 and 28. In one embodiment of the invention, for example, a support bracket is provided with a stamped aluminum main body and a steel retaining member attached to the main body with bolts. With such a configuration, the retaining member is provided with a greater tensile strength than the main body of the support bracket.

In addition, each support bracket may be configured to plastically deform only if a rear impact occurs at a great enough speed, such as greater than 6 to 8 miles per hour (mph). If only minor plastic deformation occurs, the support brackets may be able to be reused. If significant plastic deformation occurs, the support brackets may need to be replaced, while the rest of the seat assembly may remain usable and relatively undamaged.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly for use with a vehicle, the assembly comprising:
   a lower seat cushion frame adapted to be installed in the vehicle;
   an energy managing support bracket attached to the seat cushion frame;
   a recliner mechanism attached to the support bracket; and
   a seat back frame connected to the recliner mechanism such that the seat back frame is pivotable with respect to the seat cushion frame;
   wherein the recliner mechanism and the seat back frame are supported ba the support bracket, and wherein the support bracket is configured to attenuate energy associated with a rear impact to the vehicle when the assembly is installed in the vehicle, so as to inhibit rebound of the seat back frame.

2. The assembly of claim 1 wherein the support bracket has an attachment location attached to the seat cushion frame, a first portion disposed proximate the attachment location and having a first thickness, and a second portion disposed away from the attachment location and having a second thickness greater than the first thickness, the first portion being configured to attenuate energy associated with the rear impact.

3. The assembly of claim 1 wherein the support bracket includes first and second sections that respectively define first and second attachment locations that are attached to the seat cushion frame, and a tapered section deposed between the first and second sections, the tapered section being configured to attenuate energy associated with the rear impact.

4. The assembly of claim 1 wherein the support bracket includes at least one fold that is configured to attenuate energy associated with the rear impact.

5. The assembly of claim 1 wherein the support bracket includes front and rear attachment locations that are attached to the seat cushion frame, and multiple folds that extend generally radially relative to the rear attachment location, wherein the folds are configured to attenuate energy associated with the rear impact.

6. The assembly of claim 1 further comprising a seat adjustment mechanism attached to the seat cushion frame and adapted to be attached to the vehicle, the seat adjustment mechanism being configured to adjust the seat cushion frame forwardly and rearwardly with respect to the vehicle when the seat adjustment mechanism is attached to the vehicle.

7. The assembly of claim 1 wherein the recliner mechanism includes a first portion connected to the seat back frame, and a second portion connected to the support bracket, the first portion being pivotable with respect to the second portion.

8. The assembly of claim 1 wherein the support bracket is configured to plastically deform to attenuate energy associated with the rear impact.

9. The assembly of claim 1 wherein the support bracket has an aperture for attenuating energy.

10. The assembly of claim 9 wherein the support bracket has a hole extending above the aperture, and the assembly further includes a fastening member that extends through the hole for connecting the support bracket to the seat cushion frame.

11. The assembly of claim 9 wherein the aperture is an arcuate slot.

12. The assembly of claim 1 wherein the support bracket includes two apertures for attenuating energy.

13. The assembly of claim 12 wherein each aperture is an arcuate slot, and the arcuate slots are disposed next to each other.

14. The assembly of claim 13 wherein the support bracket has a hole extending above die arcuate slots, and the assembly further includes a fastening member that extends through the hole for connecting the support bracket to the seat cushion frame.

15. The assembly of claim 13 wherein the support bracket has front and rear ends, and the arcuate slots are disposed proximate the front end.

16. The assembly of claim 1 wherein the support bracket includes a main body having front and rear attachment locations that are attached to the seat cushion frame, and a retaining member attached to the Fain body proximate the front and rear attachment locations.

17. The assembly of claim 16 wherein the main body comprises a first material, and the retaining member comprises a second material different than the first material.

18. The assembly of claim 1 wherein the support bracket includes an attachment location attached to the seat cushion frame, and two apertures disposed beneath the attachment location.

19. The assembly of claim 18 wherein each aperture comprises an arcuate slot.

20. A vehicle seat assembly for use with a vehicle, the assembly comprising:
   a lower seat cushion frame adapted to be installed in the vehicle;
   a support bracket having an attachment location attached to the seat cushion frame, the support bracket further having an aperture disposed proximate to the attachment location;
   a recliner mechanism attached to the support bracket; and
   a seat back frame connected to the recliner mechanism such that the seat back frame is pivotable with respect to the seat cushion frame;
   wherein the recliner mechanism and the seat back frame are supported by the support bracket, and wherein the support bracket is configured to plastically deform proximate the aperture when a sufficient rearward force is applied to the seat back frame, so as to inhibit rebound of the seat back frame as the rearward force diminishes.

21. The assembly of claim 20 wherein the support bracket has a hole extending above the aperture, and the assembly further includes a fastening member that extends through the hole for connecting the support bracket to the seat cushion frame.

22. The assembly of claim 20 wherein the support bracket has a first thickness proximate the aperture, and a second thickness at a majority of the support bracket disposed away from the aperture.

23. The assembly of claim 20 wherein the support bracket has front and rear ends and a tapered section disposed between the ends, the tapered section being configured to plastically deform when the rearward force is applied to the seat back frame.

24. The assembly of claim 20 further comprising a seat adjustment mechanism attached to the seat cushion frame and adapted to be attached to the vehicle, the seat adjustment mechanism being configured to adjust the seat cushion frame forwardly and rearwardly with respect to the vehicle when the seat adjustment mechanism is attached to the vehicle.

25. The assembly of claim 18 wherein the recliner mechanism includes a first portion connected to the seat back frame, and a second portion connected to the support bracket, the first portion being pivotable with respect to the second portion.

26. The assembly of claim 20 wherein the aperture is an arcuate slot.

27. The assembly of claim 26 wherein the support bracket further includes an additional arcuate slot disposed beneath the arcuate slot, and wherein the support bracket is configured to plastically deform proximate the arcuate slots.

28. The assembly of claim 27 wherein the support bracket has a hole extending above the arcuate slots, and the assembly further includes a fastening member that extends through the hole for connecting the support bracket to the seat cushion frame.

29. The assembly of claim 27 wherein the support bracket has front and rear ends, and the arcuate slots are disposed proximate the front end.

30. A vehicle seat assembly for use with a vehicle, the assembly comprising:
- a seat cushion frame adapted to be installed in the vehicle;
- first and second sacrificial, energy managing support brackets that each have first and second attachment locations attached to the seat cushion frame, each support bracket further having first and second ends and multiple folds disposed generally between the ends;
- first and second recliner mechanisms respectively attached to the first and second support brackets; and
- a seat back frame connected to the recliner mechanisms such that the seat back frame is pivotable with respect to the seat cushion frame;
- wherein the recliner mechanism and the seat back frame are supported by the support brackets, and wherein each support bracket is configure to plastically deform proximate the folds when a sufficient rearward force is applied to the seat back frame, so as to inhibit rebound of the seat back frame as the rearward force diminishes and to inhibit structural damage to the recliner mechanisms and the seat back frame.

31. A vehicle seat assembly for use with a vehicle, the assembly comprising:
- a seat cushion frame adapted to be installed in the vehicle;
- an energy managing support bracket attached to the seat cushion frame;
- a recliner mechanism attached to the support bracket; and
- a seat back frame connected to the recliner mechanism such that the seat back frame is pivotable with respect to the seat cushion frame;
- wherein the support bracket has an attachment location attached to the seat cushion frame, a first portion disposed proximate the attachment location and having a first thickness, and a second portion disposed away from the attachment location and having a second thickness greater than the first thickness, the first portion being configured to attenuate energy associated with a rear impact to the vehicle when the assembly is installed in the vehicle, so as to inhibit rebound of the seat back frame.

\* \* \* \* \*

UNITED STATES PATENT AND TRADEMARK OFFICE
CERTIFICATE OF CORRECTION

PATENT NO. : 6,709,053 B1
DATED : March 23, 2004
INVENTOR(S) : Mladen Humer et al.

It is certified that error appears in the above-identified patent and that said Letters Patent is hereby corrected as shown below:

<u>Column 5,</u>
Line 19, delete "ba" and insert therefor -- by --.

<u>Column 6,</u>
Line 21, delete "Fain" and insert therefor -- main --.
Line 59, after "second thickness" and before "at a majority…" insert -- greater then the first thickness --.

<u>Column 8,</u>
Line 6, delete "configure" and insert therefor -- configured --.

Signed and Sealed this

Twenty-fifth Day of May, 2004

JON W. DUDAS
*Acting Director of the United States Patent and Trademark Office*